United States Patent [19]

Oshima et al.

[11] Patent Number: 4,847,118
[45] Date of Patent: Jul. 11, 1989

[54] MANUFACTURING METHOD FOR A LONG PATTERNED SHEET PROVIDED WITH RELIEF PATTERNS

[75] Inventors: Yasuhiro Oshima, Yao; Iwao Hasegawa, Gyoda; Katsuji Kakinuma, Adachi; Ryozi Takahashi, Kitakatsushika, all of Japan

[73] Assignee: Meiwa Gravure Chemical Co., Ltd., Osaka, Japan

[21] Appl. No.: 76,499

[22] Filed: Jul. 22, 1987

[30] Foreign Application Priority Data

Jul. 28, 1986 [JP] Japan ............................ 61-177116

[51] Int. Cl.$^4$ .......................... B05D 3/12; B05D 5/00
[52] U.S. Cl. .................................. 427/275; 427/365; 427/366

[58] Field of Search ............... 427/278, 275, 365, 366, 427/393.5, 155, 391

[56] References Cited

U.S. PATENT DOCUMENTS 4,041,197 8/1977 Gagne .............................. 427/278
4,643,916 2/1987 Kiuchi ........................... 427/278 X Primary Examiner—Michael Lusignan
Attorney, Agent, or Firm—Stevens, Davis, Miller & Mosher

[57] ABSTRACT

A manufacturing method for a long patterned sheet, wherein a long base material, which coats on one side surface thereof pasty resin, insertably passes between a metallic cylinder provided with a gelling apparatus and a press roll and is urged, thereby forming relief patterns by the pasty resin by use of engraved patterns formed at the cylinder or the press roll.

11 Claims, 1 Drawing Sheet

MANUFACTURING METHOD FOR A LONG PATTERNED SHEET PROVIDED WITH RELIEF PATTERNS

FIELD OF THE INVENTION

The present invention relates to a manufacturing method for a long patterned sheet provided with stereoscopic relief patterns, and more particularly to a manufacturing method for a long patterned sheet used mainly as a wall material, a floor material or a mounting material for various decorations.

BACKGROUND OF THE INVENTION

The conventional means for forming relief patterns on a synthetic resin film and paper includes the use of an embossing roll. However, the relief patterns by use of the embossing roll are small in depth and liable to wear out and the patterned sheet cannot be glossy at both side surfaces.

Also, there is another method for forming the relief patterns on a synthetic resin sheet by use of printing ink blended with a foaming agent, which has the problem that foaming portions are formed on the surface to weaken strength of the sheet and a transparent product cannot be obtained.

SUMMARY OF THE INVENTION

An object of the present invention is to provide a manufacturing method for a long patterned sheet using pasty resin, inexpensive to produce, stereoscopic, and free from wearing out of the relief pattern.

In other words, the present invention is characterized in that pasty resin is coated on one side surface of an elongate base material of flexibility, this base material is inserted through between a metallic cylinder and a press roll, and the pasty resin is urged to form relief patterns by use of the engraved patterns formed on the metallic cylinder or the press roll. The pasty resin is used to enable such uneven and stereoscopic relief patterns to be formed.

The long base material uses a synthetic resin sheet, a paper sheet, or a fibrous sheet. A transparent synthetic resin sheet is used to obtain a long patterned sheet in cristal-glass-like appearance, and also the metallic cylinder has a mirror-like outer periphery, the press roll is provided with engraved patterns, the long base material uses a synthetic resin sheet and passes through between the cylinder and the press roll in a manner that the synthetic resin sheet abuts against the press roll and the pasty resin against the cylinder, thereby obtaining a patterned sheet glossy at both the surfaces.

In any case, the long base material is coated with pasty resin and passes through between the metallic cylinder and the press roll, so that the pasty resin is pressed to form the relief patterns by use of the engraved patterns provided at the cylinder or the press roll, thereby forming with ease sufficiently stereoscopic relief patterns.

The above and further objects and novel features of the invention will more fully appear from the following detailed description when the same is read in connection with the accompanying drawings.

DETAILED DESCRIPTION OF THE INVENTION

Figure 1:
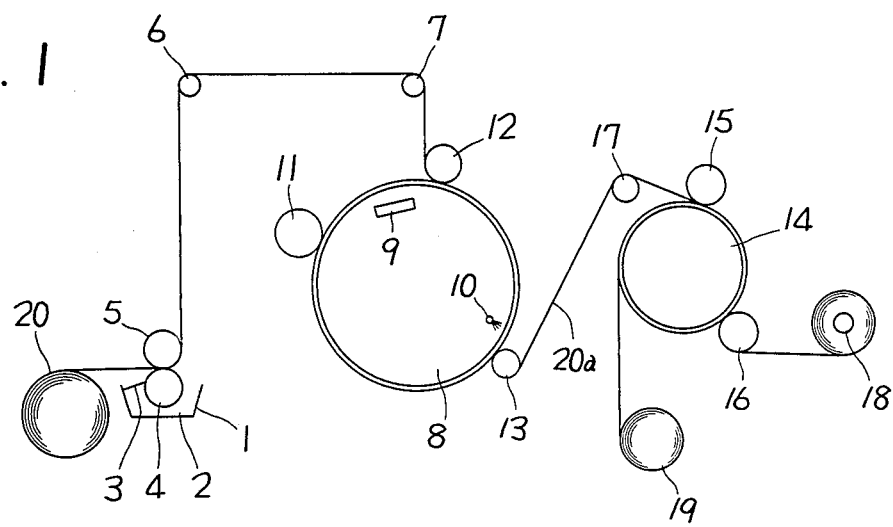
FIG. 1 is a schematic view explanatory of s press-molding apparatus used in a manufacturing method of the invention.

Firstly, a first embodiment of a press-molding apparatus used in a manufacturing method of the invention will be described according to FIG. 1, in which reference numeral 1 designates a reservoir for pasty resin to be discussed below. The reservoir 1 contains therein transparent, translucent, or opaque pasty resin 2, such as vinyl chloride resin, silicone resin, epoxy resin, or ultraviolet curing resin. At the upper portion of the reservoir 1 are provided a resin applying roll 4 rotatable and entering in part into the reservoir 1 and a doctor blade 3 disposed laterally of the applying roll 4. A rubber receiver roll 5 is supported rotatably above the applying roll 4 and opposite thereto.

The applying roll 4 is rough at the outer periphery and serves to coat pasty resin stored in the reservoir 1 onto one side surface of a long base material 20 formed mainly of a synthetic resin sheet.

Reference numerals 6 and 7 designate rotatable guide rolls disposed above the receiving roll 5 and laterally spaced with a predetermined interval, a rotatable metallic cylinder 8 being provided below the guide roll 7. In addition, the metallic cylinder 8 is of mirror finish at the outer periphery and provided therein with a heating burner 9 and a cooling water spray nozzle 10 positioned thereunder and spaced therefrom.

A rubber roll 11 rotatable substantially in contact with the metallic cylinder 8 is disposed slantwise upwardly thereof. Below the guide roller 7 and above the cylinder 8 is disposed a press roll 12 formed mainly of silicone rubber and provided at the outer periphery with engraved patterns.

Figure 2:
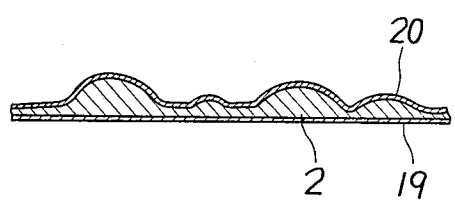
FIG. 2 is a partially sectional view of a product by the apparatus in FIG. 1.
Figure 4:
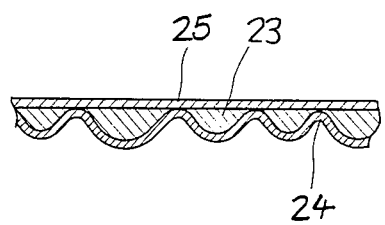
FIG. 4 is a partially sectional view of a product by the apparatus in FIG. 3.

The press roll 12 presses the pasty resin 2 coated on the long base material 20 to form relief patterns, the engraved patterns being optionally designed and deep enough to obtain the stereoscopic relief patterns, the engraved portions thereof being curved in section as shown in, for example, FIG. 2.

Also, at the lower portion of the cylinder 8 is provided a peel-off roll 13, and at the lateral side of the cylinder 8 is disposed a sticking cylinder 14 for sticking onto the rear surface of the long patterned sheet peeled off by the peel-off roll 13 a lining 19 formed mainly of a synthetic resin sheet.

The sticking cylinder 14 is provided with a heating system (not shown) so as to stick the lining 19 onto the sheet 20 in a heating condition. Also, the sicking cylinder 14 rotatably supports at the upper portion thereof a rubber press roll 15 and at the lower portion a take-off roll 16 for taking off the long patterned sheet with the lining 19 from the sticking cylinder 14.

In addition, reference numeral 17 designates a guide roll rotatably provided between the peel-off roll 13 and the press roll 15, and 18 designates a take-up reel provided near the take-off roll 16.

Next, explanation will be given on a manufacturing method of the invention using the aforesaid apparatus.

The long flexible base material 20 of synthetic resin passes through between the receiver roll 5 and the applying roll 4 and the pasty resin 2 contained in the reservoir 1 is coated on the one side surface of the long base material 20, in which surplus resin 2 on the applying roll 4 is scrapped off by the doctor plate 3. Since the receiver roll 5 is provided opposite to the applying roll 4, the pasty resin 2 can be uniformly coated onto the sheet 20. The long base material 20, after coated with the pasty resin 2, is transferred to the press roll 12 through the guide rolls 6 and 7.

The pasty resin 2, at the position of the press roll 12, comes into contact with the metallic cylinder 8 having the mirror-finished surface, the long base material 20 entering into the engraved patterns on the press roll 12 through the pasty resin 2, thereby forming the relief patterns thereof.

In other words, the relief patterns are formed on the long base material 20. The metallic cylinder 8, which is heated by the heating burner 9 in the vicinity of the portion urged by the press roll 12, allows the pasty resin to gel to an extent of eliminating its flexibility. Then, the metallic cylinder 8 rotates to further heat the long base material 20 and half-gelled pasty resin 2 between the heating burner 9 and the water spray nozzle 10, so that the resin 20 completely gels and is cooled by the water spray nozzle 10. Thereafter, the long base material 20 is peeled off from the metallic cylinder 8 to be formed in a long relief patterned sheet product 20a.

In continuation of the peeling-off, the long patterned sheeet product 20a is fed between the sticking cylinder 14 and the press roll 15 through the guide roll 17, and a lining 19 of paper, cloth, a hard transparent vinyl chloride resin sheet, or a soft synthetic resin film, is fed to the sticking cylinder 14 through the press roll 15, the lining 19 and long relief patterned sheet 20a being integral with each other by being heated by the cylinder 14 and thereafter peeled off by the take-off roll 16 therefrom. Then, a product of the patterned sheet 20a with the lining 19 is wound onto the takeup reel 18.

In a case of using the ultraviolet curing type pasty resin, a synthetic resin sheet is used as the long base material 20, and an ultraviolet ray generator, instead of the heating burner 9, is disposed outside the metallic cylinder 8, thereby obtaining a product of long relief patterned sheet.

In a case where, for example, epoxy resin or urethane resin, having adhesive property to metal is used as the pasty resin 2, the relief patterns similarly to the above are formed with the pasty resin 2 on a thermoplastic synthetic resin film while the film is being fed and pressed onto the metallic cylinder 8 through the rubber roll 11, thereby enabling the long patterned sheet product to be obtained.

Such product, as shown in FIG. 2, can materialize thereon fine and stereoscopic relief patterns formed by the engraved patterns on the press roll 12. When a transparent synthetic resin sheet is used as the flexible base material 20, the one side surface of the relief patterned sheet is formed of the transparent synthetic resin sheet and the other side surface of the same is formed of the gelled resin in contact entirely with the mirror surface of the metallic cylinder 8, thereby making the produced sheet glossy at both side surfaces. Also, transparent resin is used as the pasty resin 2 and the product is different partially in thickness, whereby the light impinging on the product is irregularly reflected therefrom, thus obtaining the product of crystal-glass-like appearance.

Also, the pasty resin 2 is blended with an opaque material, such as calcium carbonate, and made opaque, thereby obtaining a product having relief patterns glossy like porcelain.

Figure 3:
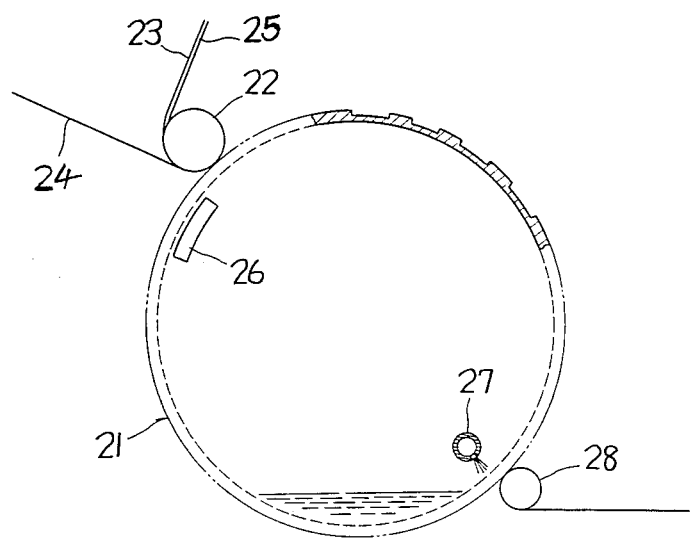
FIG. 3 is an illustration of a modified embodiment of a press-molding aparatus.

Alternatively, the manufacturing method of the invention can be carried out by use of a press-molding apparatus as shown in FIG. 3.

In FIG. 3, the press-molding apparatus uses a metallic cylinder 21 on which optional patterns are engraved and a press roll 22 of the smooth surface. A long base material 24 formed of, for example, a colorless, transparent vinyl chloride resin film at one side surface of which pasty resin 23, such as vinyl chloride resin, is uniformly coated, and a flexible long sheet 25 formed of a vinyl chloride resin film, are overlapped with each other in three layers and allowed to pass through between the cylinder 21 and the press roll 22.

Such passing brings the long sheet 25 in contact with the cylinder 21 of engraved patterns so that the long sheet 25 is pressed by the smooth press roll 22 so as to enter into the engraved portions at the cylinder 21 through the pasty resin 23, thereby forming the relief patterns therewith. The cylinder 21 is heated at the pressed portion by a heating burner 26, so that the pasty resin 23 complerely gels and is cooled by water from a cooling water spray nozzle 27. Thereafter, the relief patterned sheet is peeled off by a peel-off roller 28 from the cylinder 21, thereby obtaining a product of, for example, ceramic appearance.

Embodiment 1

The long base material 20 of flexibility uses a transparent vinyl chloride resin film of 0.1 mm in thickness, the pasty resin 2 uses a mixture of 100 parts by weight of PSH-680 (by Kanegafuchi Chamical Co., Ltd.) (vinyl chloride resin), 44 parts by weight of D.O.P. (by Sekisui Chemical Co., Ltd.) (plasticizer) , 2.5 parts by weight of BZ-171J (Katsuda Chemical Industry Co., Ltd.) (stabilizer), and 0.05 parts by weight of a colorant, the metallic cylinder 8 is rotated at the circumferential speed of 3 m per min, heated by the burner 9 in the vicinity thereof at a temperature of 130° C. and up to 180° C. between the press roll 12 and the peel-off roll 13, thereby having obtained a product formed in section as shown in FIG. 2. In addition, a colorless, transparent vinyl chloride sheet or a polyester tulle net is used as the lining 9.

Embodiment 2

A colorless transparent vinyl chloride resin film of 0.15 mm in thickness is used as the long base material 20 of flexibility, an opaque mixture of 100 parts by weight of 121 (by Japanese Geon Co., Ltd.) (vinyl chloride resin), 60 parts by weight of dioctyl phthalate (by Daihachi Chemical Co., Ltd.) (plasticizer), 2 parts by weight of MA-10 (by Akijima Chemical Industry Co., Ltd.), 100 parts by weight of calcium carbonate (by Bihoku Funka Co., Ltd.) (stabilizer), and 5 parts by weight of a colorant, is used as the pasty resin 2, and the metallic cylinder 8 is rotated under the same condition as the embodiment 1, thereby having obtained a product of relief patterns of porcelain-like glossiness.

Embodiment 3

A polyester nonwoven fabric of 100 g-m$^2$ is used as the long base material 20 of flexibility, an opaque mixture of 50 parts by weight of 121 (by Japanese Geon Co., Ltd.) (vinyl chloride resin), 30 parts by weight of Ex-13 (by Sumitomo Chemical Co., Ltd.) (vinyl chloride resin), 20 parts by weight of 103ZX (by Japanese Geon Co., Ltd.) (vinyl chloride resin), 60 parts by weight of dioctyl phthalate (by Daihachi Chemical Co., Ltd.) (plasticizer), 3 parts by weight of Ma-10 (by Akijima Chemical Industry Co., Ltd.) (stabilizer), 2 parts by weight of Cab-O-Sil #300 (by Cabot Corporation) (sillica anhydride), and 5 parts by weight of a colorant, is used as the pasty resin 2, the metallic cylinder 8 is rotated at the circumferential speed of 2.5 m per min, and the cylinder 8 is heated at a temperature of 150° C. in the vicinity of the heating burner 9 and at a temperature of 190° C. between the press roll 12 and the peeloff roll 13, thereby having obtained a long patterned sheet product remaining a touch of the original unwoven fabric.

Embodiment 4

Between the metallic cylinder 21 rotating at the circumferential speed of 3.5 m per min and the rubber roll 22 rotatable and smooth at the surface is fed a long sheet 25 comprising; a long base material 24 formed of a colorless, transparent soft vinyl chloride resin of 0.2 mm in thickness and uniformly coated on one side surface with pasty resin 23 mixed with 100 parts by weight of 121 (by Japanese Geon Co., Ltd.) (vinyl chloride resin), 50 parts by weight of dioctyl phthalate (by Sekisui Chemical Co., Ltd.) (plasticizer), 2 parts by weight of MS-1B (by Katsuda Chemical Industry Co., Ltd.) (Stabilizer), and 0.5 parts by weight of a colorant; and a colored soft vinyl chloride resin film of 0.12 mm in thickness. At this position, the long sheet 25 contacts with the cylinder 21 and enters into the engraved portions on the cylinder 21 through the pasty resin 23, thereby forming relief patterns. The cylinder 21 is heated in the vicinity of the entering portion up to a temperature of 180° C. by the heating burner 26 disposed in the cylinder 21. Hence, the long sheet 25 completely gels to be cooled by cooling water and is peeled off from the take off roll 28, thereby being a product of ceramic-like appearance.

Although several embodiments have been described, they are merely exemplary of the invention and not to be constructed as limiting, the invention being defined solely by the appended claims.

What is claimed is:

1. A method for manufacturing a long patterned flexible sheet provided with relief patterns, comprising the steps of
    coating pasty resin on a surface of a long flexible base material, passing said coated base material between a rotatable metallic cylinder and a rotatable press roll opposite to the outer periphery of said metallic cylinder, having the outer peripheral surface of one of said cylinder and said press roll provided with engraving patterns on the surface thereof, the outer peripheral surface of the other of said cylinder and said press roll being smooth, partially gelling said pasty resin coating, urging said base material and partially gelled pasty resin coating to thereby mold said relief patterns on said base material and pasty resin and peeling off said base material from said cylinder after said pasty resin coating has gelled; wherein the base material coated with the pasty resin is inserted between said cylinder and said press roll such that the base material is in contact with the engraving pattern on the surface of one of said cylinder and press roll and the resin coating is in contact with the smooth surface of the other of said cylinder and press roll; such that the resin side surface remains smooth and the relief pattern is formed on the base material side surface.

2. A method according to claim 1, wherein the outer periphery of said metallic cylinder is a mirror surface, and the outer periphery of said press roll is provided with said engraving patterns, and wherein said base material and pasty resin coating are passed between said cylinder and press roll so that said base material contacts said press roll and said pasty resin coating contacts said cylinder.

3. A method according to claim 1, wherein a lining is adhered to a surface of said long patterned sheet after said patterned sheet has been peeled off from said metallic cylinder.

4. A method according to claim 1, wherein a long flexible sheet is overlapped with the pasty resin coated surface of said base material, and wherein said sheet, pasty resin and base material form three layers so that said three layers pass between said cylinder and said press roll.

5. A method according to claim 4, wherein said base material is transparent film, and wherein said gelled pasty resin coating and transparent base material of the resulting product of said method produce a crystal glass-like appearance.

6. A method according to claim 1, wherein said base material is synthetic resin.

7. A method according to claim 6, wherein said synthetic resin base material is transparent and said pasty resin coating is transparent synthetic resin wherein said gelled pasty resin coating and transparent base material of the resulting product of said method produce a crystal glass-like appearance.

8. A method according to claim 2, wherein said base material and said pasty resin coating comprise synthetic transparent resins wherein said gelled pasty resin coating and transparent base material of the resulting product of said method produce a crystal glass-like appearance.

9. A method according to claim 1, wherein said base material is paper.

10. A method according to claim 1, wherein said base material is fibrous.

11. A method according to claim 1, wherein said pasty resin coating is an ultraviolet curing resin and said base material is synthetic resin.

* * * * *